Sept. 14, 1948.   G. A. DEAN   2,449,457
DEICING SYSTEM FOR PROPELLER BLADES
Filed May 25, 1946   2 Sheets-Sheet 1

INVENTOR.
George A. Dean
BY
ATTORNEY

Sept. 14, 1948.  G. A. DEAN  2,449,457
DEICING SYSTEM FOR PROPELLER BLADES
Filed May 25, 1946  2 Sheets-Sheet 2

INVENTOR.
George A. Dean
BY
Godfrey B. Spein
ATTORNEY

Patented Sept. 14, 1948

2,449,457

UNITED STATES PATENT OFFICE 2,449,457

DEICING SYSTEM FOR PROPELLER BLADES

George A. Dean, Radburn, N. J., assignor to Curtiss-Wright Corporation, a corporation of Delaware Application May 25, 1946, Serial No. 672,295

7 Claims. (Cl. 244—134)

This invention concerns aircraft propellers and relates particularly to improvements in de-icing or anti-icing systems for propeller blades.

Several approaches have been made to the problem of ice elimination on propeller blades, including fluid anti-icing, pastes and lacquers used as blade coatings to minimize ice adhesion, electrical blade heating systems, and systems which pass heated air or exhaust gas into hollow propeller blades to raise their temperature sufficiently to prevent ice formation or to melt ice that may have formed thereon so that the ice may be flung from the blades by centrifugal force. It is with the latter class of apparatus that the present invention is associated.

A primary object of the invention is to provide a structurally simple and adequate system for transferring hot gas from a stationary part of the aircraft to hollow propeller blades of a controllable pitch propeller. A further object is to provide hot gas transfer means which will provide adequate tightness against the leakage of hot gas during rotation of the propeller and during pitch change of the propeller blades in their hub during all normal positions of pitch adjustment encountered during flight.

The above objects are accomplished by the structure and arrangements set forth in the following detailed description when read in connection with the accompanying drawings. It is to be expressly understood however, that the drawings are employed for the purpose of illustration only and are not designed as a definition of the limits of the invention, reference being had to the appended claims for this purpose.

In the drawings, Fig. 1 is a side elevation of a portion of an aircraft propeller and associated power plant structure, showing elements of the present invention in section;

A conventional propeller hub is indicated at 10 and is mounted on a propeller shaft 12 extending outwardly from the power plant structure, such as an engine nose 14. The forward end of the propeller is provided with suitable pitch changing mechanism, conventional in the art, whose housing is indicated at 16. The hub has a plurality of blade sockets of which one is shown at 18, this socket being fitted with a propeller blade 20 which is journalled in the socket for pitch changing movement under the influence of the pitch changing power unit.

Figure 1:
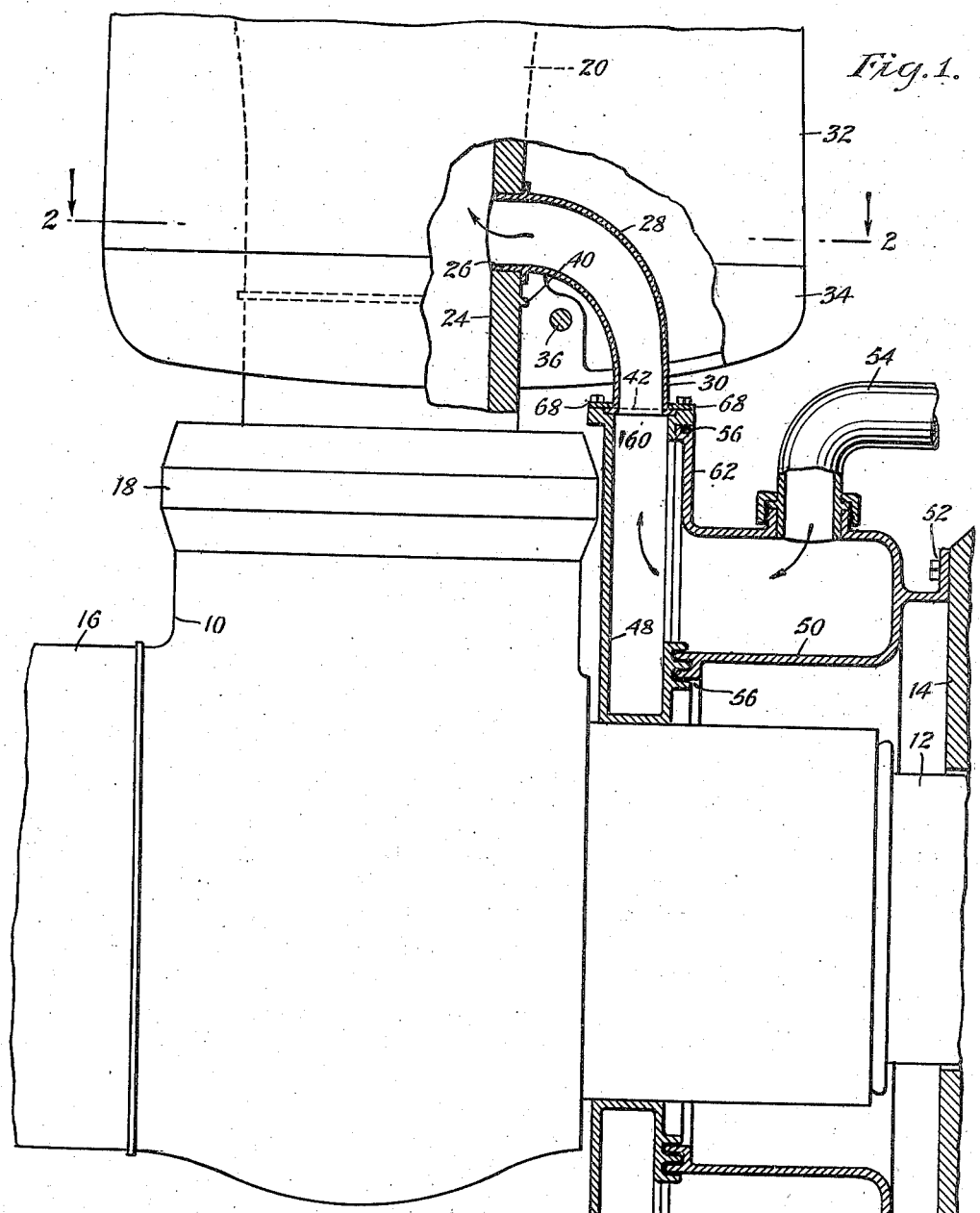
Fig. 1a is a section of a propeller blade tip.
Figure 1A:
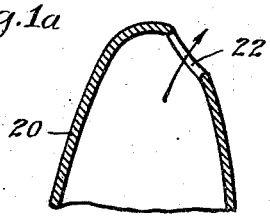
Figure 2:
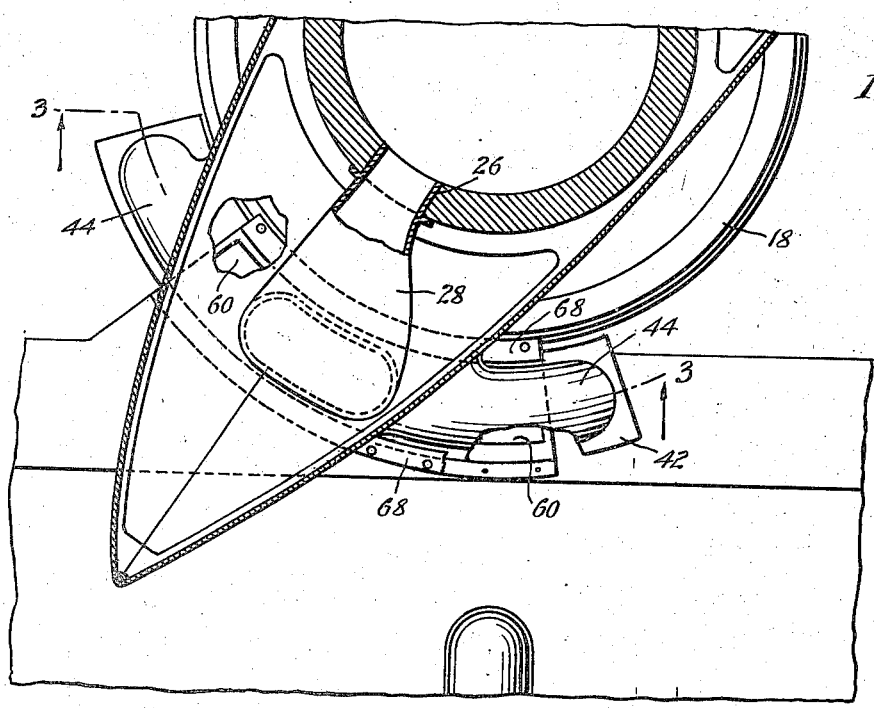
Fig. 2 is a section on the line 2—2 of Fig. 1.
Figure 3:
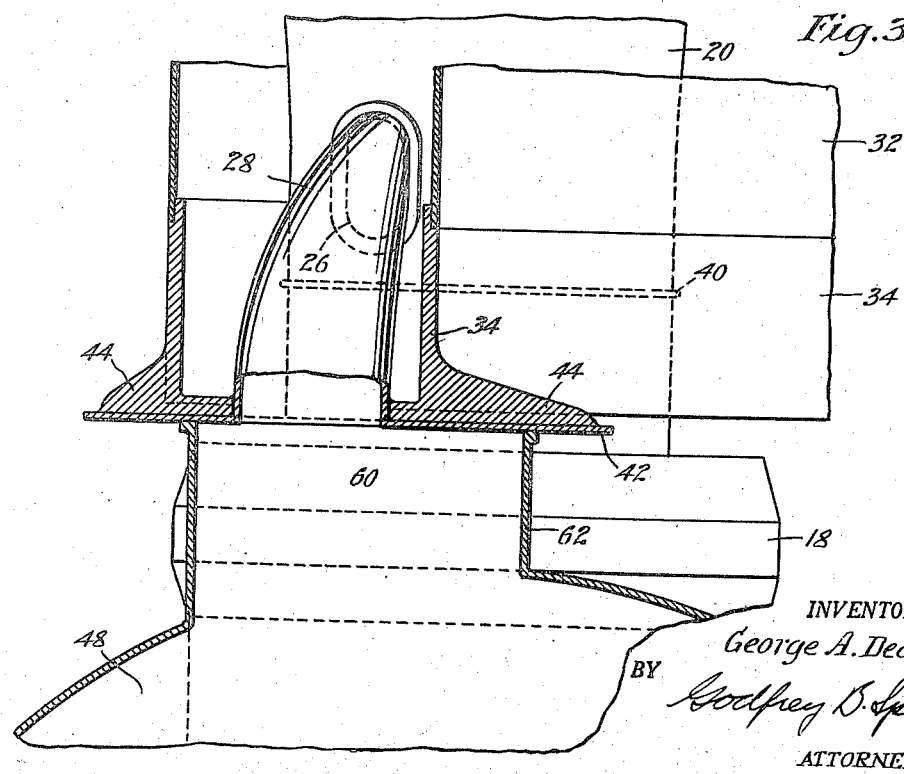
Fig. 3 is a section on the line 3—3 of Fig. 2.

The blade 20 is preferably of hollow metallic construction and is provided, as shown in Fig. 1a, with an outlet opening 22 at its tip. The shank portion of the blade 24 is formed with an opening 26 to which is secured an elbow conduit 28 extending rearwardly and downwardly to an inlet end 30. The opening 26 is preferably located on a transverse axis of the blade where minimum stress is encountered so that the blade opening will have the smallest possible effect in reducing the strength of the blade. As is conventional practice in some propellers, the blade shank 24 is embraced by a cuff 32 secured to a bottom fitting 34 made in two halves and bolted around the blade shank as bolts 36. The bottom fitting embraces a rib 40 formed on the propeller blade shank which serves to lock the cuff and to hold it against centrifugal force during propeller rotation.

The terminal end 30 of the conduit 28 passes through the bottom fitting 34 and carries an arcuate plate or cover 42 which is concentric with the propeller blade axis and which subtends an arc which is something more than twice the normal operating pitch range of the propeller blade. For instance, in operation, the blade may change from an approximate 18 degrees pitch angle during take-off up to approximately a 50 degree pitch angle during high speed aircraft flight whereupon the normal operating range of the blade would be 32 degrees. The plate 42 therefore would have an arcuate embracement of 64 degrees plus the additional angle subtended by the terminal end 30 of the conduit 28, making the total arcuate embracement of the plate 42 approximately 90 degrees. Since the plate 42 is subject to centrifugal force during blade rotation, the plate is strengthened against this force by extending portions of the cuff fitting 34 to form brackets 44 extending beyond the normal cuff profile and reaching nearly to the ends of the plate 42. The conduit terminal 30 passes through the cover plate 42 substantially at its mid-point.

To the propeller hub is secured an annular chamber 48 which rotates with the propeller hub and is open at its rearward face for communication with a fixed annular manifold 50 secured to the power plant as at 52. The manifold 50 is fed with hot air, exhaust gas or other suitable hot gaseous medium through a pipe 54. Since the chamber 48 rotates relative to the manifold 50 a labyrinth seal is provided at 56 between these two elements to minimize hot gas leakage and is further provided with an outer ring seal 58 to minimize leakage, and to permit free rotation of the chamber 48 relative to the manifold 50.

The chamber 48 is provided with a plurality of outlet openings 60 equal in number to the number of blades of the propeller, each said outlet opening being defined by an arcuate extension 62 projecting outwardly from the chamber 48 and terminating at its outer end in an arcuate slot. The arcuate embracement of the opening 60 is approximately equal to the normal pitch range of the propeller above mentioned, plus the arcuate extent of the terminal 30 of the conduit 28 and this terminal 30 lies over some portion of the slot and in communication therewith during all normal pitch positions of the propeller blade. The cover plate 42 seats closely upon top face of the slot 64, and all portions of the slot are sealed by this cover plate except where the terminal 30 passes through the cover plate and into complete communication with the chamber 48. Lips 66 overlie the edges of the cover plate 42 and are secured to the edges of the extension 62 to hold the cover plate and conduit terminal 30 in firm engagement with the extension and its associated parts whereby leakage at this connection will be minimized.

In the operation of controllable pitch propellers, it is sometimes desired to feather their blades or to move the blades to a reverse pitch position. When this is done on a propeller embodying the anti-icing system shown, the cover plate 42 will uncover a portion of the opening 60 and the conduit terminal 30 will pass beyond one or the other end of the opening 60 so that hot air or hot gas will not pass from the manifold to the blade interior. This is not particularly important since, when reverse pitch operation or feathering is accomplished, the need for propeller de-icing is insignificant. Thus, the de-icing system is designed solely to take care of normal operating pitch ranges without redundant ducting and other mechanism which would add weight to the system.

During normal operation, under icing conditions, the hot gas will feed from the manifold 50 into the chamber 48, into the conduits 28 and thence into the hollow propeller blades where it will warm the blades and then pass through the blade tips to openings 22. The rotation of the propeller blades provides in effect a centrifugal pump by which the flow of hot gas through the blades is augmented.

It is to be understood that the term "controllable pitch propeller" used herein includes a power driven hub, blades mounted for pitch change during flight in hub sockets, and suitable means to cause and control blade pitch changes during flight.

Though but a single embodiment illustrating the invention has been illustrated and described, it is to be understood that the invention may be applied in various forms. Changes may be made in the arrangement shown, for instance, by incorporating the conduit 28 as an integral part of the cuff bottom fitting 34; the arrangement of arcuate slot 64 and cover plate 42 might be inverted where the slot is carried by the propeller blade and the conduit is carried by the manifold. These changes would be made without departing from the spirit or scope of the invention as will be apparent to those skilled in the art and reference should be made to the appended claims for a definition of the limits of the invention.

What is claimed is:

1. In a controllable pitch propeller having a hollow blade, a transfer chamber on the hub, means to feed a hot gaseous medium to said chamber, and means to conduct hot gaseous medium from said chamber to said blade, said conducting means comprising an arcuate slip joint concentric with the blade axis of rotation in the hub and having the relatively slipping members of the joint in communication with the hollow of said blade and with the interior of said chamber.

2. In a controllable pitch propeller having hollow blades, an annular manifold rotatable with the propeller hub, means to fed a hot gaseous medium to said manifold, said manifold having a plurality of outlet openings one for each blade, said outlet openings having arcuate form and being concentric with the blade axis of rotation, and a duct leading into each blade having its inlet end registering with a portion of the respective manifold outlet opening, said duct being movable with the blade and sweeping the length of said opening during normal blade pitch changes.

3. In a controllable pitch propeller having hollow blades, an annular manifold rotatable with the propeller hub, means to feed a hot gaseous medium to said manifold, said manifold having a plurality of outlet openings one for each blade, said outlet openings having arcuate form and being concentric with the blade axis of rotation and lying in planes normal to the respective blade axes, and a duct leading into each blade having its inlet end registering with a portion of the respective manifold outlet opening, said duct being movable with the blade and sweeping the length of said opening during normal blade pitch changes.

4. In a controllable pitch propeller having hollow blades, an annular manifold rotatable with the propeller hub, means to feed a hot gaseous medium to said manifold, said manifold having a plurality of outlet openings one for each blade, said outlet openings having arcuate form and being concentric with the blade axis of rotation, a duct leading into each blade having its inlet end registering with a portion of the respective manifold outlet opening, said duct being movable with the blade and sweeping the length of said opening during normal blade pitch changes, and a shroud embracing the inlet end of said duct, covering those portions of said outlet opening not registering with said duct.

5. In a controllable pitch propeller having a hollow blade, a transfer chamber rotatable with the hub, means to feed a hot gaseous medium to said chamber, said chamber being disposed in offset relation to the blade plane of rotation and having an arcuate opening therein concentric with the blade axis of rotation, the angle subtended by said arcuate opening being substantially equal to the pitch angle range of said blade during operation in flight, an arcuate closure slidably secured to said chamber over said arcuate opening, and a conduit passing through said closure substantially midway of the closure length for communication with said chamber, said conduit opening into the hollow of said blade.

6. In a controllable pitch propeller having a hollow blade, a transfer chamber rotatable with the hub, means to feed a hot gaseous medium to said chamber, said chamber being disposed in offset relation to the blade plane of rotation and having an arcuate opening therein concentric with the blade axis of rotation, the angle subtended by said arcuate opening being substantially equal to the pitch angle range of said blade during operation in flight, an arcuate closure slidably secured to said chamber over said arcuate opening, a conduit passing through said closure substantially midway of the closure length for communication with said chamber, said conduit opening into the hollow of said blade, and a cuff embracing the shank end of said propeller blade comprising a structural support for said conduit and closure and wholly embracing the conduit.

7. In a controllable pitch propeller having a hollow blade, a transfer chamber rotatable with the hub, means to feed a hot gaseous medium to said chamber, said chamber being disposed in offset relation to the blade plane of rotation and having an arcuate opening therein concentric with the blade axis of rotation, the angle subtended by said arcuate opening being substantially equal to the pitch angle range of said blade during operation in flight, an arcuate closure slidably secured to said chamber over said arcuate opening, a conduit passing through said closure substantially midway of the closure length for communication with said chamber, said conduit opening into the hollow of said blade, and said closure and conduit being so disposed and arranged as to allow blade pitch movement beyond normal operating pitch limits with disruption of the flow path of gaseous medium from the chamber to the blade until such normal operating pitch limits are re-established.

GEORGE A. DEAN.

REFERENCES CITED

The following references are of record in the file of this patent:

UNITED STATES PATENTS

| Number | Name | Date |
|---|---|---|
| 1,899,689 | Houston | Feb. 28, 1933 |

FOREIGN PATENTS

| Number | Country | Date |
|---|---|---|
| 506,444 | Great Britain | May 30, 1939 |